3,051,693
METHOD OF POLYMERIZING ACETYLENIC
COMPOUNDS
Joseph R. Leto, Stamford, Conn., assignor to American Cyanamid Company, Stamford, Conn., a corporation of Maine
No Drawing. Filed Jan. 29, 1960, Ser. No. 5,372
15 Claims. (Cl. 260—94.1)

This invention relates broadly to certain new and useful improvements in a method of polymerization. More particularly, it is concerned with a method of polymerizing a polymerizable material including (or consisting essentially of) a compound having acetylenic (triple-bonded) unsaturation, e.g., acetylene, $CH\equiv CH$, and the various mono-substituted acetylenes, $RC\equiv CH$, where R represents a monovalent substituent. Thus, the monovalent substituent represented by R can be a monovalent organic radical, examples of which latter are the monovalent hydrocarbon radicals and the monovalent substituted, e.g., hydroxy-substituted, carboxy-substituted and esterified carboxy-substituted, hydrocarbon radicals. The aforesaid polymerizable material may be a single compound having a mono-acetylenic unsaturation only or a plurality (two, three or any higher number) of acetylenic unsaturations; or it may be a plurality (one, two, three or any higher number that may be desired) of such compounds in any proportions; or it may be one or more of such compounds admixed with one or more other, different, polymerizable materials, e.g., polymerizable compounds having only ethylenic (double-bonded) or both ethylenic and acetylenic unsaturation.

It was known prior to the present invention to polymerize acetylene and monosubstituted acetylenes alone or admixed with each other or with other polymerizable materials containing ethylenic or acetylenic unsaturation. However, to the best of my knowledge and belief it was not known or suggested prior to the present invention that polymerizable materials including or comprising a compound having acetylenic unsaturation (hereafter, for brevity, sometimes designated generally as "acetylenic compound" or "acetylenic-containing compound") could be polymerized to new and useful polymers (homopolymers and copolymers) of the starting acetylenic compound with the aid of the particular catalyst which is used in practicing the instant invention.

The present invention is based on my discovery that a catalyst comprising a carbonyl of a group VIB metal is effective for use in the polymerization of an acetylenic compound of the kind described above. More particularly I have found that the aforesaid catalyst is effective while the said compound, i.e., a polymerizable material including a compound having acetylenic unsaturation, is distributed throughout (e.g., dissolved and/or dispersed in a liquid reaction medium) and while the said material or compound is in reactive relationship with a catalyst comprising the said carbonyl. For purpose of brevity the liquid reaction medium or media and sometimes designated hereafter as "solvent" or "solvents." The primary advantages of the invention reside in the simplicity of the operation and in the availability and stability of the catalyst employed.

As has been stated, the catalyst is "a carbonyl of a group VIB metal." By this term, as used in this specification and in the appended claims, is meant a compound having a carbonyl group or groups attached directly to a hexa-coordinated metal of group VIB, specifically molybdenum, tungsten or chromium. The catalyst can be an unsubstituted hexacarbonyl of a group VIB metal as in, for example, molybdenum hexacarbonyl, $Mo(CO)_6$, and tungsten hexacarbonyl, $W(CO)_6$. Such compounds may be represented by the general formula $M(CO)_6$ where M represents a group VIB metal. Alternatively, the catalyst can be a substituted hexacarbonyl of a group VIB metal. Such substituted hexacarbonyls may be represented by the general formula I  $LnM(CO)_m$ where M represents a hexa-coordinated metal of group VIB; L represents at least one substituent attached directly to M; n is an integer corresponding to the total coordingating capacity of L and is at least 1; m is an integer and is at least 1; and the sum of n and m is 6. The substituent L may be, for instance, a monodentate ligand or a polydentate ligand.

Illustrative examples of monodentate ligands represented by L in the above formula include trialkyl- (including tricycloalkyl-), triaryl-, trialkaryl- (including tricycloalkyl-substituted aryl-) and triaralkyl- (including triaryl-substituted cycloalkyl-) phosphines, phosphites, arsines, stibines and their halogen- (including pseudohalogen-) substituted derivatives; and nitrogen-containing donors, e.g., ammonia; amines, more particularly primary, secondary and tertiary amines such as mono-, di- and trialkyl amines including, for instance, monopropyl amine, diethyl amine, triethyl amine; also, pyridine; etc.

Illustrative examples of polyvalent, i.e., poly- (e.g., di-, tri-, tetra-, etc.) dentate, ligands represented by L in the above formula include substituted or unsubstituted cyclopentadienide ion, cycloheptatrienylium ion, cyclopentadienone, quinone, benzene, etc.; carbocyclic compounds containing two, three or four carbon-to-carbon double bonds in the ring, e.g., cyclooctatetraene, cycloheptatriene, bicycloheptadiene, etc., and polyamines, e.g., ethylenediamine, diethylenetriamine, o-phenylenediamine, etc.

More specific examples of catalysts which are useful in practicing the present invention are:

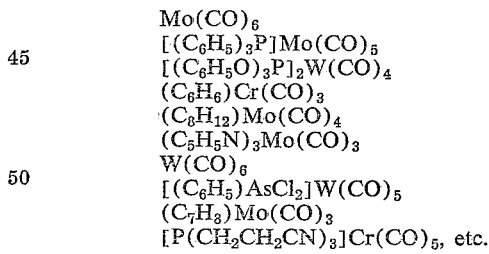
$Mo(CO)_6$
$[(C_6H_5)_3P]Mo(CO)_5$
$[(C_6H_5O)_3P]_2W(CO)_4$
$(C_6H_6)Cr(CO)_3$
$(C_8H_{12})Mo(CO)_4$
$(C_5H_5N)_3Mo(CO)_3$
$W(CO)_6$
$[(C_6H_5)AsCl_2]W(CO)_5$
$(C_7H_8)Mo(CO)_3$
$[P(CH_2CH_2CN)_3]Cr(CO)_5$, etc.

Other examples will be apparent to those skilled in the art from Formula I and the definitions and illustrative examples of ligands given in the portion of the specification following that formula.

Illustrative examples of solvents or diluents that may be used as the reaction medium are water; hydrocarbons, e.g., petroleum ether, cyclohexane, n-pentane, benzene, etc.; aliphatic, cycloaliphatic or aliphatic-aromatic ethers, e.g., diethyl ether, ethyl isopropyl ether, methyl heptyl ether, isopropyl phenyl ether, hexyl phenyl ether, ethyl octyl ether, 1,2-dimethoxyethane, bis-(2-methoxyethyl) ether, tetrahydrofuran, dioxane, etc.; aliphatic ketones, e.g., acetone, methyl ethyl ketone, ethyl hexyl ketone, etc.; aliphatic alcohols, e.g., ethanol, isopropanol, n-butanol, trimethylcarbinol, amyl alcohol, etc.; aliphatic nitriles, e.g., acetonitrile, propionitrile, etc.; and amides such as dimethylformamide. Mixtures of water with organic solvents or diluents such as those mentioned above by way of example may also be used. The chosen reaction medium, if not normally a liquid, should be liquefiable at reaction temperature. The reaction medium (solvent or diluent) is one which is inert (substantially inert) to the acetylenic compound, the catalyst and to the reaction product, more particularly polymeric reaction product.

To the best of my knowledge and belief any acetylenic compound of the kind described and defined hereinbefore, or any polymerizable material containing such a compound, can be polymerized while it is in a liquid reaction medium and is in reactive relationship with a catalyst comprising a carbonyl of a group VIB metal. The preferred acetylenic compound is one represented by the general formula II      $RC \equiv CH$ where R represents a member of the class consisting of H, alkyl, alkenyl, alkynyl, aralkyl, aryl and alkaryl radicals, and mono- and poly(i.e., multi)carboxy- and esterified carboxy-substituted, and mono- and polyhydroxy-substituted alkyl, alkenyl, alkynyl, aryl, alkaryl and aralkyl radicals.

Examples of compounds embraced by Formula II are acetylene itself; monomethyl through monoöctadecyl acetylenes (including the isomeric forms thereof, and the cycloalkyl acetylenes such as cyclopentyl, cyclohexyl, cycloheptyl, etc., acetylenes), and other monoalkyl acetylenes; vinyl acetylene ($CH_2=CH-C \equiv CH$), 3-vinyl-propyne-1 ($CH_2=CH-CH_2-C \equiv CH$), isopropenyl acetylene $$(CH_2=C-C \equiv CH)$$
$$\quad\quad |$$
$$\quad\quad CH_3$$

1,5-hexadiyne [$CH \equiv C-(CH_2)_2-C \equiv CH$], 1,6-heptadiyne [$CH \equiv C-(CH_2)_3-C \equiv CH$], 1,7-octadiyne, 1,8-nonadiyne, and other monoalkenyl acetylenes and monoalkynyl acetylenes; the benzyl, phenylethyl, phenylpropyl and other monoaralkyl acetylenes; phenyl, biphenylyl or xenyl, naphthyl and other monoaryl acetylenes; the tolyl, xylyl, ethylphenyl, propylphenyl, methyl- and dimethyl-naphthyl and other monoalkaryl acetylenes; and the mono- and poly- (i.e., where the structure permits, di-, tri-, tetra-, penta- and higher multi)carboxy-substituted, and esterified carboxy-substituted, and mono- and polyhydroxy-substituted alkyl, alkenyl, alkynyl, aryl, alkaryl and aralkyl acetylenes corresponding to those monohydrocarbon-substituted acetylenes just given by way of example.

The specific names of some of the substituted acetylenes that can be polymerized as herein described, either alone or with other copolymerizable materials, are methyl acetylene, ethyl acetylene, hexyne-1, heptyne-1, phenyl acetylene, propargyl alcohol, propargyl acetate, propiolic acid, ethyl propiolate, 3-butyn-1-ol, 1-ethynylcyclohexanol, 3-methyl-1-butyne-3-ol, etc.

The polymers formed by the catalytic polymerization reactions of this invention are, for example, (1) homopolymeric acetylene, which is a black, graphite-like material characterized by the presence of an absorption band in the infrared at 1011 cm.$^{-1}$; (2) homopolymers of monosubstituted acetylenes; (3) copolymers of unsubstituted acetylene and monosubstituted acetylenes in any proportions; and (4) copolymers of unsubstituted acetylene and/or a monosubstituted acetylene with one or more other copolymerizable materials, e.g., etheylenically unsaturated compounds and, more particularly, ethylenically unsaturated compounds such as those which contain a $CH_2=C=$ grouping or groupings, e.g., allene, butadiene, etc. The copolymers of (2), (3) and (4) are, in general, solid or oily materials of variable color with characteristic infrared absorptions depending upon the particular comonomers employed in making the particular copolymer. In making the copolymers of (4), the unsubstituted and/or monosubstituted acetylene advantageously constitutes a substantial amount, e.g., at least about 20% by weight of the polymerizable mixture and any comonomer or comonomers, if employed, constitute the remainder.

In practicing the present invention the temperature of the reaction mixture may range, for example, from 20° to 250° C., and preferably is in the range of 100°–150° C. Ordinarily the reaction is carried out in a closed reaction vessel. The reaction may be effected at atmospheric, subatmospheric or superatmospheric pressures. Under the latter conditions the pressure during the reaction may range, for instance, from slightly above 1 atmosphere to 200 atmospheres, and preferably is in the range of 20–70 atmospheres. The period of reaction may range, for example, from 1 to 24 hours, and preferably is in the range of 2–8 hours. The ratio in parts by weight of catalyst:acetylenic compound:solvent may be in the range of, respectively, 0.01–10:1–50:100, and preferably about 0.1–5.0:5–25:100 of, respectively, catalyst:acetylenic compound:solvent.

In a typical procedure, the polymerization reaction is carried out as follows: a liquid reaction medium (for example 100 parts of tetrahydrofuran) and catalyst (for example 1 part of molybdenum hexacarbonyl) are placed in an autoclave which is then sealed and flushed with nitrogen gas. Acetylene (about 380 p.s.i.g. from a compressor) is charged into the autoclave and dissolved or dispersed in the reaction medium by rocking the whole apparatus. More acetylene is charged in, and the process is repeated until about 20 parts of acetylene have been introduced. The autoclave is then sealed, heated to 120° C. and held at this temperature for 6–8 hours. At the end of this period, the autoclave is cooled and opened, and the solid polymer is isolated and purified by conventional methods that are well known to those skilled in the art, for instance as described in Example 1.

The yield of solid polymer obtained in such a typical reaction is about 75%, based on the initial weight of the monomer or monomers present. The yield varies depending, for example, upon the particular liquid reaction medium and the other particular conditions of reaction employed. Ordinarily, however, the yield of polymer is between about 60% and 90% of the initial weight of the monomeric mixture.

It is within the scope of this invention to form the substituted group VIB metal carbonyl complex catalyst in situ in the reaction zone by introducing the metal hexacarbonyl, substituent L (see Formula I), and the acetylenic-containing compound or compounds, together with solvent, into an autoclave.

The use of carbonyls of the group VIB metals as catalysts in a liquid reaction medium (selected primarily on the basis of its ability to dissolve the particular acetylenic compound(s) employed) provides an improved method of making homopolymers and copolymers of polymerizable materials comprising one or more acetylenic compounds. The present process is cheaper than other processes for polymerizing acetylenic-containing compounds with respect to both the initial cost of catalyst and the recovery and purification of the polymeric material to free it from spent or unreacted catalyst.

In order that those skilled in the art may better understand how the present invention can be carried into effect, the following examples are given by way of illustration and not by way of limitation. All parts and percentages are by weight unless otherwise stated. Example 1 is described in detail. Examples 2 through 11 are carried out in an essentially similar manner and are given in the table, together with Example 1 in abbreviated form.

EXAMPLE 1

A 180 ml. steel pressure bomb is charged with 100 ml. anhydrous tetrahydrofuran, 5 grams molybdenum hexacarbonyl and 17 grams acetylene gas. The bomb is sealed and heated to 120° C., at which temperature it is rocked for eight hours. At the end of this period, the bomb is cooled and opened. A thick, black paste is removed quantitatively from the bomb by washing and decantation with petroleum ether. Upon filtration of this mixture there is obtained a large amount of black solid and a yellow filtrate. The black solid is extracted for eight hours in a Soxhlet apparatus with petroleum ether and is dried in vacuo at room temperature (20°–30° C.) for one hour. Yield: 12.4 grams of polyacetylene, or 73%. This material has an absorption band in the infrared at 1011 cm.$^{-1}$, and is very finely divided, passing easily through a 100-mesh sieve.

The table follows:

action to a different extent from similar reactions containing either $Cr(CO)_6$ or $P(CH_2CH_2CN)_3$ singly.

The polymers resulting from the method of this invention are useful, for instance, as lubricants; as fillers for natural and synthetic rubbers; as selected gas adsorbents; as semi-conductors; and for numerous other purposes.

I claim:

1. A method of polymerizing a polymerizable compound having acetylenic unsaturation comprising polymerizing said compound at a temperature between about 20° C. and 250° C. in a liquid reaction medium selected from the group consisting of water and an inert organic solvent, while said polymerizable compound is in catalyzed relationship with a catalyst comprising a carbonyl of a metal selected from the group consisting of molybdenum, chromium, and tungsten, wherein the ratio in parts by weight of said catalyst to said acetylenic compound to said solvent is 0.01–10:1–50:100 respectively.

*Table I*

| Example | Solvent | Catalyst | Acetylenic Compound | Conditions | Products |
|---|---|---|---|---|---|
| 1 | 100 cc. THF | 5 g. $Mo(CO)_6$ | 17 g. $C_2H_2$ | 120° C. for 8 hrs | 12.4 g. PA. |
| 2 | 100 cc. THF | 5 g. $W(CO)_6$ | 19 g. $C_2H_2$ | 120° C. for 8 hrs | 14.3 g. PA. |
| 3 | 100 cc. pet. eth | 5 g. $Mo(CO)_6$ | 10 g. $C_2H_2$ | 120° C. for 8 hrs | 5.4 g. PA. |
| 4 | 100 cc. pet. eth | 5 g. $Mo(CO)_6$ | 51 g. propyne | 120° C. for 8 hrs | 1.2 g. PP. |
| 5 | 100 cc. THF | 5 g. $Mo(CO)_6$ | 29 g. phenyl-acetylene | 120° C. for 8 hrs | 7.5 g. polymer of phenyl acetylene. |
| 6 | 100 cc. THF | 5 g. $Mo(CO)_6$ | 15 g. ethyl-propiolate | 120° C. for 8 hrs | 14 g. polymer of ethyl propiolate. |
| 7 | 100 cc. THF | 1.6 g. $C_6H_4O_2 \cdot Mo(CO)_4$ | 40 g. $C_2H_2$ | 120° C. for 8 hrs | 3 g. PA. |
| 8 | 100 cc. bis(2-methoxy-ethyl) ether | 1.0 g. $Cr(CO)_6$ / 1.5 g. $P(CH_2CH_2CN)_3$ | 22 g. $C_2H_2$ | 130° C. for 8 hrs | 14 g. PA. |
| 9 | 100 cc. pet. eth | 2 g. $W(CO)_6$ | 12 g. 1,6-hepta-diyne | 120° C. for 8 hrs | 7 g. polymer of 1,6-heptadiyne. |
| 10 | 100 cc. 1,2-di-methoxyethane | 2.5 g. $[(C_6H_5)_3P]_3Mo(CO)_3$ | 31 g. $C_2H_2$ | 120° C. for 8 hrs | 20 g. PA. |
| 11 | 100 cc. THF | 2.0 g. $Mo(CO)_6$ | 10 g. $C_2H_2$ / 15 g. propyne | 120° C. for 8 hrs | 11 g. copolymer of acetylene and propyne. |

NOTES.—"THF"=tetrahydrofuran; "PA"=polyacetylene; "PP"=polypropyne.

The polypropyne formed in Example 4 has infrared absorptions at 2960 cm.$^{-1}$ and at 970 cm.$^{-1}$. It is somewhat soluble in organic solvents, e.g., petroleum ether, acetone, tetrahydrofuran, benzene, etc., and is not reactive with air. The poly(phenylacetylene) formed in Example 5 is a stable, brown, essentially insoluble powder with characteristic infrared absorptions at 965 and 985 cm.$^{-1}$ in addition to the usual monosubstituted-phenyl absorption bands.

Example 7 given above in the table represents the pertinent data of a test wherein was used a substituted group VIB metal carbonyl. In this example $C_6H_4O_2 \cdot Mo(CO)_4$ represents a compound formed by reacting one part of $Mo(CO)_6$ with one part p-benzoquinone in refluxing tetrahydrofuran (65° C.). Two moles of carbon monoxide per mole of $Mo(CO)_6$ are displaced by the p-benzoquinone to form a substituted carbonyl such as is given immediately after Formula I with reference to the meaning of L in the said formula. The compound separates (precipitates) out of the reaction medium as a blue solid and is isolated by filtration, washed with petroleum ether and heated to 60° C. under high vacuum for three hours to remove any unreacted $Mo(CO)_6$. Although the compound is unstable in air, it may be handled in an atmosphere of nitrogen. Microanalyses and infrared spectra of this compound are consistent with the composition shown.

Example 8 given above in the table represents the pertinent data of a test in which the active catalyst is a substituted group VIB carbonyl complex prepared in situ during the polymerization reaction. With bis(2-methoxyethyl)ether ("diglyme") as the reaction medium, $Cr(CO)_6$ and $P(CH_2CH_2CN)_3$ are brought together in reactive relationship in the presence of acetylene. The catalyst species $[P(CH_2CH_2CN)_3]Cr(CO)_5$, is formed in situ and is active in the subsequent polymerization re- 2. The method as in claim 1 wherein the compound having acetylenic unsaturation between adjacent carbon atoms is acetylene.

3. The method as in claim 1 wherein the compound having acetylenic unsaturation between adjacent carbon atoms is propyne.

4. The method as in claim 1 wherein the compound having acetylenic unsaturation between adjacent carbon atoms is phenyl acetylene.

5. The method as in claim 1 wherein the compound having acetylenic unsaturation between adjacent carbon atoms is 1,6-heptadiyne.

6. The method as in claim 1 wherein the catalyst is molybdenum hexacarbonyl.

7. The method as in claim 1 wherein the catalyst is tungsten hexacarbonyl.

8. The method as in claim 1 wherein the compound having acetylenic unsaturation between adjacent carbon atoms is acetylene and the catalyst is molybdenum hexacarbonyl.

9. The method as in claim 1 wherein the compound having acetylenic unsaturation between adjacent carbon atoms is acetylene and the catalyst is tungsten hexacarbonyl.

10. The method as in claim 1 wherein the compound having acetylenic unsaturation between adjacent carbon atoms is propyne and the catalyst is molybdenum hexacarbonyl.

11. The method as in claim 1 wherein the liquid reaction medium is tetrahydrofuran.

12. The method as in claim 1 wherein the liquid reaction medium is petroleum ether.

13. A method of polymerizing a polymerizable compound having acetylenic unsaturation comprising polymerizing said compound at a temperature between about 20° C. and 250° C. in a liquid reaction medium selected from the group consisting of water and an inert organic solvent, while said polymerizable compound is in catalyzed relationship with a catalyst comprising a carbonyl of a metal selected from the group consisting of molybdenum, chromium, and tungsten, wherein the ratio in parts by weight of said catalyst to said acetylenic compound to said solvent is 0.01–10:1–50:100 respectively, and isolating the resulting polymeric material.

14. The method as in claim 13 wherein the polymerizable compound having acetylenic unsaturation between adjacent carbon atoms is acetylene and the catalyst is molybdenum hexacarbonyl.

15. The method as in claim 13 wherein the polymerizable compound having acetylenic unsaturation between adjacent carbon atoms is acetylene and the catalyst is tungsten hexacarbonyl.

References Cited in the file of this patent

Abel et al.: "Substituted Carbonyl Compounds of Chromium Molybdenum, Tungsten & Manganese," J. Chem. Soc., July 1959, 2323–2327.

Sternberg et al.: "New Mechanism of Bond Formation," Chem. & Eng. News, 43–44 May 5, 1958.